United States Patent [19]

Viramontes

[11] 4,234,105
[45] Nov. 18, 1980

[54] HOPPER AND FEED WHEEL ASSEMBLY FOR A FERTILIZER SPREADER

[75] Inventor: Jose A. Viramontes, Mesilla Park, N. Mex.

[73] Assignee: Shell Oil Company, Houston, Tex.

[21] Appl. No.: 59,806

[22] Filed: Jul. 23, 1979

[51] Int. Cl.³ ............................................. G01F 11/20
[52] U.S. Cl. .................................... 222/233; 111/77; 222/414; 222/623; 366/196
[58] Field of Search ............... 222/233, 236, 238, 368, 222/410, 414, 623; 366/196; 111/77, 78, 34

[56] References Cited

U.S. PATENT DOCUMENTS

| | | | |
|---|---|---|---|
| 544,966 | 8/1895 | Davis | 222/238 |
| 1,835,641 | 12/1931 | Finfrock | 222/623 X |
| 1,855,214 | 4/1932 | Alton | 222/414 |
| 2,755,002 | 7/1956 | Gustafson | 111/77 X |
| 2,784,881 | 3/1957 | Hines, Sr. et al. | 222/623 X |
| 3,648,631 | 3/1972 | Fiedler et al. | 111/78 X |

*Primary Examiner*—Robert J. Spar
*Assistant Examiner*—Fred A. Silverberg

[57] ABSTRACT

A hopper and feed wheel assembly for a fertilizer or pesticide spreader is described. This assembly includes an open topped storage bin or hopper having a concave or "V"-shaped bottom with a flat center plat being disposed along the center or lower most point of the base, the center plate being movable according to calibrated settings to provide a gate opening for discharge of fertilizer or pesticide. To facilitate continuous discharge of fertilizer or pesticide out of the bottom gate opening with minimal break up of particles or clogging of the gate opening, the hopper is further equipped with a feed wheel made up of a rotatable shaft traversing the width of the bin and having its longitudinal axis directly above and parallel to the length of the center plate, the shaft being affixed to a longer smaller diameter rod which is attached to the shaft at its ends and extends outward from the peripheral surface of the shaft at the points of attachment and is bent back in a direction parallel to the longitudinal axis of the shaft in a series of rod lengths which substantially traverse the length of the shaft, each rod length being joined to another by a series of reverse bends extending substantially around the periphery of the shaft.

4 Claims, 4 Drawing Figures

HOPPER AND FEED WHEEL ASSEMBLY FOR A FERTILIZER SPREADER

BACKGROUND OF THE INVENTION

This invention relates to an improvement on a spreader for field application of particulate fertilizers and/or pesticides. More particularly, this invention is directed to an improved hopper and feed wheel assembly which provides for uniform discharge of fertilizer or pesticide with minimal concomitant crushing or caking of the fertilizer or pesticide when said hopper is employed in a conventional spreader.

Fertilizer and/or pesticide spreaders currently employed in orthodox agricultural practice are typically equipped with one or more hoppers or bins for storage and metered discharge of the fertilizer or pesticide during field use. As a rule, these hopper or storage bins are box like containers having bottom outlets for continuous discharge of fertilizer into a series of tubes or channels leading to equally spaced diffusers or other suitable dispensing means at ground level for application of the fertilizer or pesticide to the soil. To control the rate at which the fertilizer or pesticide is released, the size of the bottom outlet from the hopper is typically adjustable in accordance with calibrated settings and the hopper is further equipped with some sort of scraping device located near the bottom discharge e.g., fluted feed wheel or shaft, to promote continuous discharge of fertilizer or pesticide in accordance with the rate at which the spreader moves across the field. Conventionally, this scraping device is a rotatable shaft equipped with scraper blades or flutes which is geared in some manner to the axle of the spreader so that it is powered by, and rotates with, movement of the spreader. For example, the "7100 Mounted Max-Emerge Planter" Series planter/spreaders sold by John Deere employ insecticide and/or herbicide hoppers which are opened top (coverable by a hinged lid) box-like containers with concave bases having bottom slit-shaped discharge openings which may be adjusted in size or closed by means of a movable metal plate. The insecticide and/or herbicide hopper of this series planter/spreader is also equipped with a fluted feed wheel, that is a rotatable metal shaft having radially extending blades or cleats, located immediately above the slit shaped discharge opening which is rotated by means of a chain drive geared from the axle shafts of the spreader wheels. While this spreader and others like it having blade-type feed wheels for uniform discharge of granular product from the hopper operate in a satisfactory fashion in many field applications, certain problems have been experienced with continued or long term use. Specifically, it has been found that some pesticide products exhibit a tendency to pulverize and cake around and immediately below the hopper outlet. Further, the radially disposed blades or cleats on the feed wheels show considerable wear, becoming torn and jagged after extended use. While the cause of these problems has not been established with certainty, it appears that the churning action of the cleats acts to crush and pulverize the pesticide granules, causing the pesticide to become compacted rather than flowable in the area of the hopper outlet. This compacted medium promotes abrasion of the cleats causing the excessive wear observed.

From the foregoing, it is apparent that considerable advantage would be obtained if the hopper/feed wheel assembly could be modified in some way to avoid the problems associated with fluted or cleat-type feed wheels.

DESCRIPTION OF THE PRIOR ART

U.S. Pat. No. 544,966 to Davis discloses a fertilizer distributor made up of a hopper disposed directly above a feed wheel such that fertilizer passed through the bottom outlet of the hopper is picked up by the feed wheel at a uniform rate and distributed to the soil. According to the patent teaching, the feed wheels are preferably recessed or corrugated so as to provide suitable cavities or cups to receive the fertilizing material for distribution. The hopper portion of the disclosed distributor is also equipped with an agitator in its lower portion to stir and feed the fertilizer to the feed wheels. This agitator is comprised of a rotatable agitator shaft horizontally disposed in the hopper, said agitator shaft being further equipped with a series of metallic rods or wires bent in the shape of loops which encircle and are attached to the shaft at their center points and flare out at their end portions to the left and right of the point of attachment. While this agitator design differs from the fluted feed wheel construction currently employed, it does not appear to possess any particular advantage over the current design. For example, the curved end portions of the agitator wires which flare left and right from the point of attachment would appear to be particularly susceptible to bending and breaking under heavy duty use. Further, if one of the "free" end portions of the agitator wire did break off it can be foreseen that considerable damage could be done to the remaining agitator wires and hopper outlet resulting in significant down time and repair expense.

SUMMARY OF THE INVENTION

An improved hopper and feed wheel assembly for a fertilizer and/or pesticide spreader has been developed which minimizes the product crushing and caking tendencies of the prior art hopper and fluted feed wheel design while at the same time being sufficiently durable to provide long term use under actual field conditions. This improved assembly is comprised of an open topped bin or hopper having a concave or tapered e.g., "V"-shaped, bottom which is equipped with a bottom discharge opening at its center or lower most point, said discharge opening being closeable or adjustable in size by means of a movble plate which is located below and is affixed to the hopper bottom and which moves over the discharge opening in accordance with calibrated settings. In the assembly according to the invention, the hopper is further equipped with a horizontally disposed feed wheel made up of a rotatable shaft traversing the width of the hopper and having its longitudinal axis directly above the bottom discharge opening, said shaft being affixed to a longer smaller diameter rod which is attached at its ends to the same end or opposite ends of the shaft inside the hopper and extends outward from the peripheral surface of the shaft at the points of attachment and is bent back in a direction substantially parallel to the longitudinal axis of the shaft in a series of rod lengths which substantially traverse the length of the shaft inside the hopper, each rod length being jointed endwise to the next adjacent rod length by a series of reverse bends extending substantially around the periphery of the shaft. To insure optimum scraping action and movement of fertilizer and pesticide particles out of the hopper when the bottom discharge is opened, each rod length traversing the longitudinal axis of the shaft is further bent relative to its distance from the shaft at various points along its length such that a series of protuberances are formed on each rod length with the combined number and positioning of the protuberance on all of the rod lengths being such that all points along the rod lengths at a maximum distance from the shaft as defined by the apexes of the protuberances are contacted; the shaft being positioned so that the apexes of the rod protuberances closely approach the bottom of the hopper as defined by the bottom discharge opening when the shaft is rotated. When the hopper and feed wheel assembly of the invention is incorporated into a conventional fertilizer and/or pesticide spreader, the feed wheel is connected via suitable driving means to the wheel axle such that the feed wheel rotates as the spreader is pulled over the field.

DESCRIPTION OF THE PREFERRED EMBODIMENT

The hopper or storage bin having employed in the hopper/feed wheel assembly of the present invention is essentially conventional in design that is, an open-topped, box like or cylindrical container having a concave or tapered i.e., "V" shaped, base which has an adjustable opening at its lowest point or bottom for discharge of granular product. To avoid possible contamination of the contained fertilizer and/or pesticide and to insure operation safety, the top of the hopper is typically equipped with hinged lid so that the top of the hopper can be closed during use. The discharge or bottom opening in the hopper may be of any suitable configuration—i.e., rectangular, oval, triangular etc.—and is preferable in the shape of slit which is tapered at one end and disposed longitudinally along the center of lowermost point of the hopper base. To regulate the size of the discharge opening and the rate at which granular product is released, the hopper is suitably fitted with a movable plate which is positioned immediately below the discharge opening such that it can slide over and cover all or a portion of the opening in accordance with calibrated settings. The size of the storage bin housing employed in the assembly according to the invention may vary in accordance with conventional practice depending on the size of the spreader and the number of hoppers positioned on the spreader. Typically, the storage bins are sized to hold from about 50 to about 150 pounds of granular product when filled to capacity. The sides and base of the storage bin is suitably fabricated out of a rigid plastic such as polyethylene or polypropylene or out of sheet metal. In a conventional spreader construction, from 4 to 12 storage bins are positioned along a horizontal bar or frame in accordance with the row spacing in the field (30 to 40 inch spacing). The plate employed to adjust or close the bottom discharge opening from the hopper or storage bin is most suitably constructed out of metal (steel or other iron alloy) or plastic coated metal. Very suitable hopper design is that employed by John Deere for application of herbicides and/or insecticides in their 7100 Max-Emerge planter.

The improvement according to the invention is centered in the unique design of the feed wheel used to promote uniform discharge of granular fertilizer and/or pesticide product from the hopper or storage bin. This feed wheel is made up, in part, of a horizontally disposed, rotatable shaft located in the lower portion of the hopper with its longitudinal axis directly above and substantially parallel to the bottom discharge opening of the hopper. To provide the agitation and scraping action necessary to move granular product out of the bottom hopper discharge at a uniform rate, the rotatable shaft is affixed to a longer, small diameter rod or wire which is attached at its ends the same or opposite ends of the shaft inside the hopper and wound around the shaft in a novel configuration that promotes agitation and scraping while minimizing compaction and/or pulverization of the granular product. Specifically, from the points of attachment at the same end or opposite ends of the rotatable shaft, the smaller diameter rod extends outward from the peripheral surface of the shaft for a short distance and is then bent inward to an orientation which is substantially parallel to the longitudinal axis of the shaft in a series of rod lengths which substantially traverse the length of the shaft, each rod length being joined endwise to the next adjacent rod length by a series of reverse bends extending substantially around the periphery of the shaft. For optimized scraping and agitation, each rod length traversing the longitudinal axis of the shaft is further bent relative to its distance from the shaft at various points along its length such that a series of protuberances are formed on each rod length with the combined number and positioning of the protuberances on all of the rod lengths being such that all points along the rod lengths at a maximum distance from the shaft as defined by the apexes of the protuberances are contacted; the shaft being positioned so that the apexes of the rod protuberances closely approach the bottom of the hopper as defined by the bottom discharge opening when the shaft is rotated.

The central shaft and attached rod or wire winding making up the improved feed wheel of the invention are suitably fabricated from any conventional metallic material which will resist wear and breakage under field use conditions. Iron and/or iron alloys may be employed as the material of construction for both the central shaft and the wire winding with stainless or mild steel being preferred and stainless steel being most preferred. Typically the central shaft is constructed from $\frac{1}{2}''$ to $1\frac{1}{2}''$ diameter stainless or thick-wall, mild steel tubing with $\frac{3}{4}''$ to $1''$ stainless diameter tubing being preferred. The smaller diameter rod or wire which is wound around the central shaft in the unique configuration described above is typically $\frac{1}{8}''$ to $\frac{1}{4}''$ mild or stainless steel rod material and preferably 5/32" stainless steel rod. In a suitable feed wheel configuration, the small diamter rod extends out from its points of attachment to the central shaft so that an approximate $\frac{1}{8}''$ to $\frac{1}{4}''$ gap exists between the tubing and the apexes of the protuberances on the lateral rod lengths (rod lengths traversing the length of the central shaft). As pointed out above, in a typical feed wheel and hopper assembly, the lateral rod lengths traverse substantially the entire length of the central shaft and in the case of the 7100 series Max-Emerge planter sold by John Deere the lateral rod lengths are typically about 2—2 $\frac{1}{2}''$ in length. Further for effective operation, it is desirable to space the lateral rod lengths by means of reverse bends in the rod so that there exists no more than about $\frac{1}{2}''$ between lateral rod lengths. Suitably, the ends of the rod wound around the central shaft are attached to the periphery of the shaft by means of conventional welds.

The feed wheel in the hopper and feed wheel assembly of the invention is suitably positioned in the lower portion of the hopper so that a 150" to 5/32" gap exists between the apexes of the protuberances of the lateral rod lengths of the feed wheel and the base of the hopper as defined by the bottom discharge opening. The central shaft, itself, traverses or extends across substantially the entire width of the hopper and can, in one embodiment, extend through the sides of the hopper being held in place by the support provided from the sides of the hopper or suitable brackets thereon. Preferably, the central shaft extends substantially across the width of the hopper such that its ends approach but do not extend through the hopper walls. In this preferred embodiment, the central shaft (and feed wheel) is a hollow tube fitted over and affixed to a smaller diameter, solid drive shaft which extends through each side of the hopper and is fastened to the central shaft by conventional means, i.e. pressure clips or cotter pins which extend through holes in the ends of the central shaft overlapping the drive shaft into a similar hole drilled through the drive shaft. Typically, the holes cut into the sides of the hopper to accommodate the drive shaft are fitted with removable bushings to aid the free rotation of the drive shaft and attached feed wheel. The tolerances between the drive shaft and bushings and the bushings and hopper walls are minimal to prevent material from escaping. In this preferred embodiment, the feed wheel (central shaft) is centered relative to the hopper walls so that the effectiveness of the feed wheel agitation is maximized. In a typical configuration of the hopper and feed wheel assembly of the invention, the central shaft of the feed wheel or, preferably, the drive shaft affixed to the central shaft extends beyond the hopper side panel on one or both sides of the hopper for a sufficient distance that the central shaft can be fitted with a suitable driving means for imparting rotation to the shaft e.g. pulley or gear connected via a belt or chain to the spreader drive shaft or axle.

In one embodiment, the central shaft extending beyond the hopper side panel or either or both sides of the hopper is perforated through its periphery with a hole sized to accomodate a cotter pin which connects the central shaft to a larger diameter drive shaft which in turn is connected to the wheel axle of the spreader by suitable driving means e.g., chain drive.

The invention will now be further elucidated with reference to the drawings.

Figure 1:
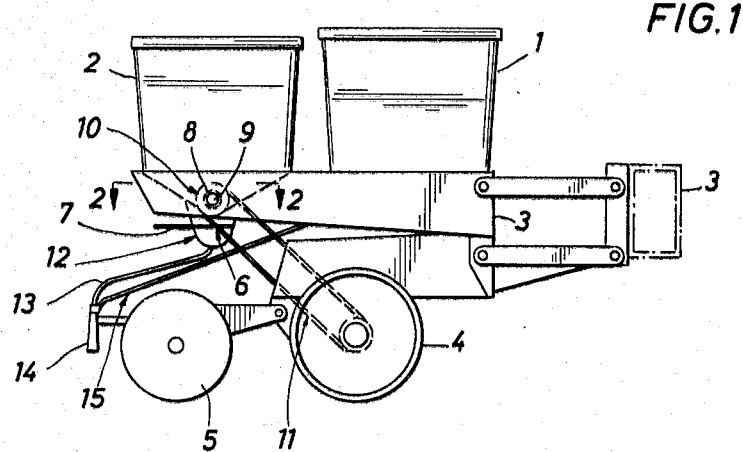
FIG. 1 is a side view of a fertilizer and/or pesticide spreader/planter employing the improved hopper and feed wheel assembly of the invention taken in partial cross-section.

Referring to FIG. 1, a simplified version of a fertilizer and/or pesticide spreader/planter employing the improved feed wheel and hopper assembly of the invention includes a front mounted seed hopper 1 and a rear mounted fertilizer and/or pesticide hopper 2, (typically 4 to 12 hoppers aligned in parallel according to the row spacing) which sit on a main frame 3, carried by two or more drive guage wheels 4. Also attached to the main frame is a series of closing wheels 5, (one per hopper) for covering the furrow in which the seeds are placed by the planter mechanism (details not shown). The fertilizer and/or pesticide hopper 2, has a concave or tapered bottom or base which is equipped with a slit shaped discharge opening 6, at its lowermost point for release of a granular product. The size of the slit-shaped discharge opening 6, and rate of granular product release is controlled by means of a movable plate 7, which slides over and closes the discharge opening in accordance with calibrated settings. The fertilizer and/or pesticide hopper is also equipped in its lower portion with a feed wheel 8, having the unique configuration according to the invention. This feed wheel which is described in greater detail below, traverses the width of the hopper bottom in a longitudinal orientation immediately above the bottom dischare opening and is further connected on both sides to a drive shaft 9 which extends through the sides of the hopper. This drive shaft is fitted with a chain gear 10, on one end extending beyond the hopper side which, in turn, is connected to the axle of the drive wheel by means of a chain 11, to impart rotation on the feed wheel when the spreader is pulled through the field. In the embodiment shown in the figure, granular product is released at a controlled rate from the hopper bottom discharge into a receiving spout 12, which is connected at its bottom to a distribution tube or hose 13, leading to a dispenser 14, held in position by means of a brace 15 to the main frame.

Figure 2:
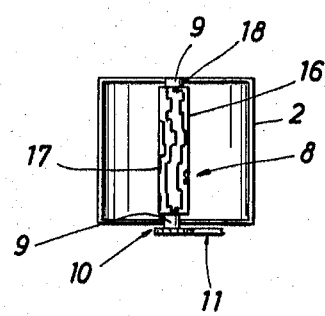
FIG. 2 is a cross-section of the hopper looking down on the feed wheel and hopper base from line 2–2 of FIG. 1.
Figure 4:
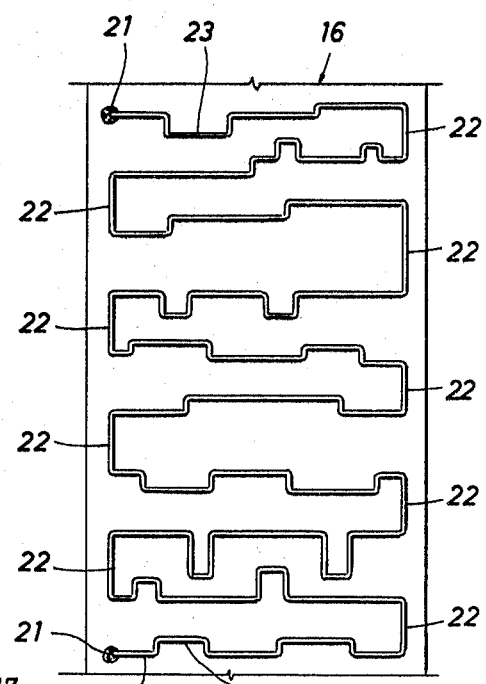
FIG. 4 is a planar view of the periphery of the portion of the central shaft of the feed wheel according to the invention which is located inside the hopper.
Figure 3:
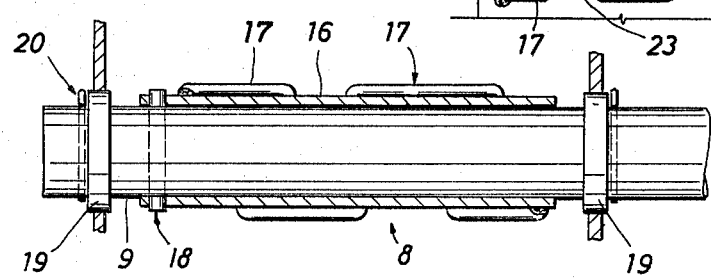
FIG. 3 is a side view of the feed wheel according to the invention.

As shown in FIG. 2, the feed wheel 8 of the invention is centered in the concave base of the hopper 2, at a point immediately above the discharge outlet (not shown). This feed wheel comprised of a central shaft or tube 16, and an attached, smaller diameter rod winding 17 of a unique configuration (see below). Referring to both FIGS. 2 and 3, it can be seen that the central shaft 16 of the feed wheel terminates inside the hopper walls and is connected on each end to a smaller diameter solid drive shaft 9 by means of a pressure clip 18. Specifically, the larger diameter central shaft (hollow tube configuration) slides over the smaller diameter drive shaft to the extent that holes in the peripheral surface of the central shaft and a bore hole through the drive shaft can be lined up and fitted with the center pin of a pressure clip to hold the two shafts together in rigid fashion. The ends of the solid drive shaft 9, which protrude through the hopper walls are fitted on one end with a chain gear or drive sprocket 10 while the other end may be suitably attached to a hopper twin (not shown). The walls of the hopper penetrated by the drive shaft are fitted with removable bushings 19 in the drive shaft holes to allow free rotation of the solid drive shaft. The tolerances between the drive shaft and bushings and the bushings and hopper wall are minimal to prevent granular material from escaping. In addition, the portion of the drive shaft extending beyond the hopper wall is suitably fitted with a cotter pin 20 to minimize lateral movement of the feed wheel and hold it in position. The smaller diameter rod winding 17 which surrounds the portion of the central shaft 16 inside the hopper is, as shown in FIGS. 3 and 4, attached to the periphery of the central shaft by means of welds 21 at each rod end. From the points of attachment, the smaller diameter rod is bent outward from the peripherhal surface of the shaft and then back in an orientation substantially parallel with the longitudinal axis of the central shaft to form a series of lateral rod lengths connected by reverse rod bends 22 which extend substantially around the peripehry of the shaft. To provide the benefits of the invention each lateral rod length is further bent in an outward direction from the shaft periphery to form a series of protuberances 23, all raised the same distance from the shaft periphery; the combined number and positioning of the protuberances being such that all points of the material in the hopper along the lateral rod lengths are contacted by a portion or portions of one or more protuberances.

What is claimed is:

1. A hopper and feed wheel assembly for a fertilizer and/or pesticide spreader comprising:
   (a) an open-topped hopper having a tapered bottom which is equipped with a bottom discharge opening at its lower most point, said discharge opening being closeable or adjustable in any size by means of a movable plate which is located below and is affixed to the hopper bottom and which moves over the discharge opening in accordance with calibrated settings;
   (b) a horizontally disposed feed wheel made up of a rotatable shaft traversing the width of the hopper and having its longitudinal axis directly above the bottom discharge opening, a longer smaller diameter rod is attached at its ends to the outside peripheral surface of the shaft inside the hopper and said rod extends outward from the peripheral surface of the shaft at the attached ends and is bent back in a direction substantially parallel to the longitudinal axis of the shaft in a series of rod lengths which substantially traverse the length of the shaft inside the hopper, each of said rod lengths being joined endwise to the next adjacent rod length by a series of reverse bends extending substantially around the pheriphery of the shaft, each of said rod lengths traversing the longitudinal axis of the shaft being further bent at various points along the length such that a series of protuberances are formed on each of said rod lengths with the combined number and positioning of the protuberances on all of the rod lengths being such that all points along the rod lengths at a maximum distance from the shaft as defined by apexes of the protuberances are contacted; the rotatable shaft being positioned in the hopper so that the apexes of the rod protuberances closely approach the bottom of the hopper as defined by the bottom discharge opening when the shaft is rotated;
   (c) a means for holding the feed wheel in position in the hopper and for imparting rotation on the shaft of the feed wheel.

2. The hopper and feed wheel assembly of claim 1 wherein the shaft of the feed wheel is a hollow tube and the feed wheel is held in position in the hopper by means of a smaller diameter solid drive shaft which extends through the hopper side walls, said hollow feed wheel shaft being slid over the smaller diameter drive shaft and affixed thereto.

3. The hopper and feed wheel assembly of claim 2 wherein the means for imparting rotation to the shaft of the feed wheel includes a drive connected to at least one end of the solid drive shaft extending beyond the side of the hopper.

4. The hopper and feed wheel assembly of claim 3, wherein the feed wheel is positioned so that about a ⅛" to 5/32" gap exists between the apexes of the protuberances of the rod lengths traversing the shaft and the base of the hopper as defined by the bottom discharge opening.

* * * * *